(12) United States Patent
Lent et al.

(10) Patent No.: US 6,226,227 B1
(45) Date of Patent: May 1, 2001

(54) MANUAL SCAN IMAGING SONAR

(75) Inventors: Keith Lent; Kenneth Krueger, both of Austin, TX (US)

(73) Assignee: Board of Regents, The Universiity of Texas System, Austin, TX (US)

(*) Notice: Subject to any disclaimer, the term of this patent is extended or adjusted under 35 U.S.C. 154(b) by 0 days.

(21) Appl. No.: 09/276,430

(22) Filed: Mar. 25, 1999

Related U.S. Application Data

(60) Provisional application No. 60/079,351, filed on Mar. 25, 1998.

(51) Int. Cl.⁷ .................................................. G01S 15/89
(52) U.S. Cl. ............................................... 367/104
(58) Field of Search ........................... 367/104, 910, 367/12, 7, 11, 107, 111

(56) References Cited

U.S. PATENT DOCUMENTS

| | | |
|---|---|---|
| 3,045,206 | 7/1962 | Ahrens et al. . |
| 3,800,273 | 3/1974 | Rolle . |
| 4,212,258 | 7/1980 | Collins ................................. 114/312 |
| 4,347,591 | 8/1982 | Stembridge et al. ................ 367/104 |
| 4,935,906 | 6/1990 | Baker et al. ......................... 367/111 |
| 5,079,753 | 1/1992 | Suggs ................................... 367/107 |
| 5,148,412 | 9/1992 | Suggs ................................... 361/131 |
| 5,231,610 | 7/1993 | Barksdale et al. ..................... 367/99 |
| 5,293,351 | 3/1994 | Noponen ................................. 367/7 |
| 5,463,597 | 10/1995 | Harlev ................................. 367/107 |

OTHER PUBLICATIONS

"Diver held imaging sonars," Mar. 17 1999, pp. 1–3.

*Primary Examiner*—Daniel T. Pihulic
(74) *Attorney, Agent, or Firm*—Fulbright & Jaworski, LLP

(57) ABSTRACT

A manual scan sonar integrates multiple technologies into a compact and low cost single beam sonar having the ability to generate wide sector views comparable to that of much larger and more expensive multiple-beam sonar units. The manual scan sonar uses a piezoelectric transducer, orientation and motion sensors, a power preamplifier and amplifier, and a microcomputer with a display, all contained within a compact waterproof housing. In operation, the user scans the sonar across an area, and the orientation and motion sensors monitor the user's natural human motion to provide bearing information which is processed and stored by the microcomputer. The ultrasonic information provided by the sound echoes is displayed on the display screen of the computer as a continuous sector. This sonar may be adapted for either diver-held or topside use.

39 Claims, 4 Drawing Sheets

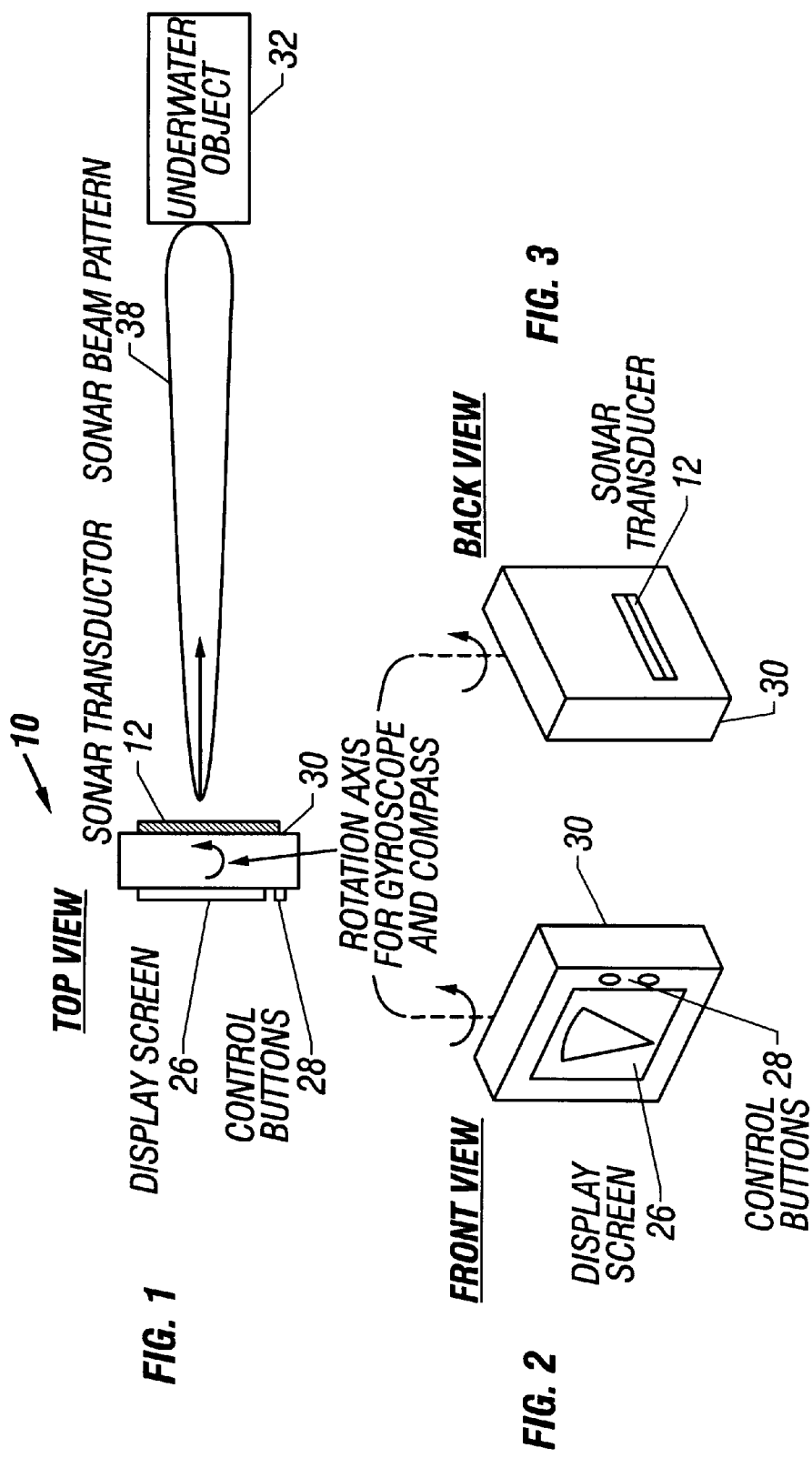

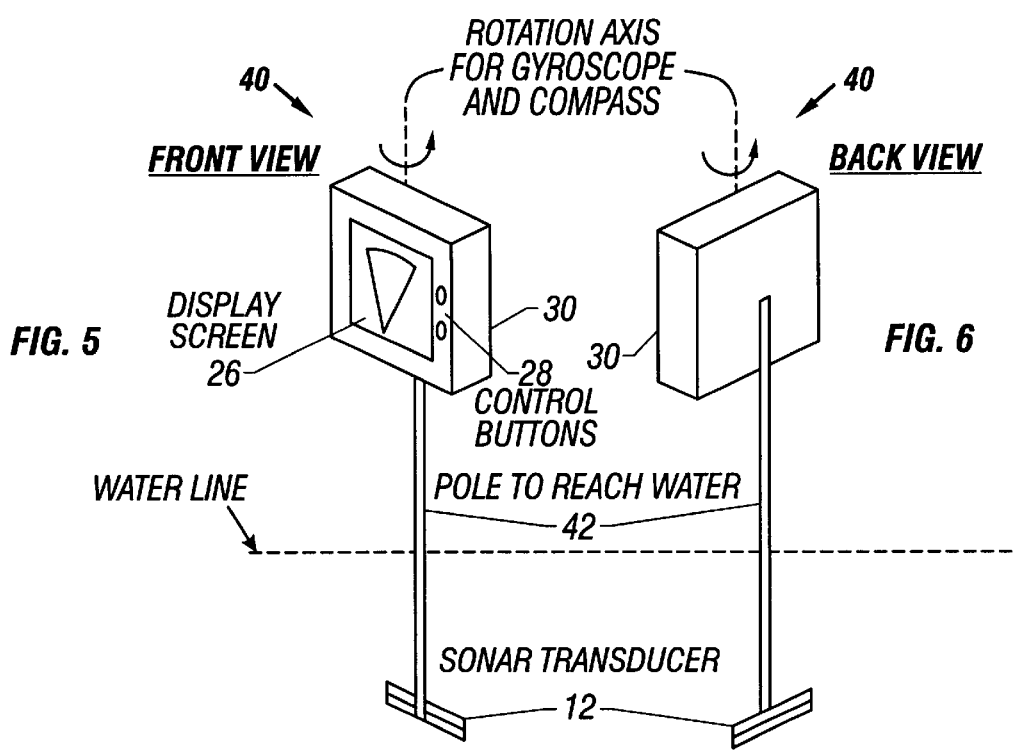

MANUAL SCAN IMAGING SONAR

This application hereby claims priority to U.S. Provisional Application Ser. No. 60/079,351, filed Mar. 25, 1998.

FIELD OF THE INVENTION

The present invention relates generally to a self contained sonar device, and more specifically to a manual scan imaging sonar.

BACKGROUND OF THE INVENTION

A sonar (an acronym for Sound Navigation and Ranging) is a sensing system which measures features of an environment by the way in which that environment transmits, reflects and/or absorbs acoustic waves. It is generally used to detect objects or to determine their direction/bearing and distance/range. The earliest and simplest sonar imaging measured sound pulse reflections off the ocean floor. By determining the time between the transmission of the pulse and receipt of the reflection of the pulse, dividing by a factor of two, and multiplying by the speed of sound in water, depth could be determined.

Sonar units have many applications for individual, commercial, as well as government use. For example, individuals may use a sonar system to inspect docks and boat hulls, to recover lost objects, to treasure hunt, or to perform geographic and contour mapping of local areas. Commercial users may use sonar units to inspect ship hulls, to inspect oil wells, to assess underwater damage, and to assess fisheries, for example, by locating and mapping fish. Similarly, the government uses sonar units to perform underwater surveillance for security, reconnaissance, ordinance classification and hydrographic surveys; to recover lost objects; to train divers; to train marine mammals; to rescue people; to assess damage; and to inspect ship hulls.

Traditional sonar systems of similar application fall into three categories: single beam mechanical scan, single beam hand held, and multiple beam hand held. Each of these types of systems have limitations which can limit their usefulness. Existing mechanically scanned single beam sonar units require a stable platform and stepper motors for operation, which preclude use by a diver. Hand held single beam sonar units, on the other hand, only provide range information to the diver who is therefore required to remember the location of all targets. Multiple beam hand held sonar units continuously display range and bearing for targets over a limited sector, but require an amount of circuitry proportional to the sector coverage, thereby increasing the size of the sonar. Thus, the size and power requirements of a multiple beam hand held sonar significantly limit sector extent, resolution, and maneuverability.

SUMMARY OF THE INVENTION

The present invention integrates multiple technologies into a small, low cost, easily maneuverable, self-contained, single beam manual scan sonar. This manual scan sonar generates wide sector views from a single narrow beam using solid state components to eliminate moving parts. This unit may be used by divers and/or topside personnel to record large area underwater scenes and identify specific objects.

In one form, the manual scan imaging sonar comprises a piezoelectric ceramic transducer, orientation and motion sensors, amplification circuitry, and a microcomputer with display capability which is used for operator interface. The orientation and motion sensors may include a flux gate compass to measure bearing, an angle rate sensor (based on, for example, a solid state gyroscope) to more accurately measure bearing in between compass updates, and a fluid sensor to measure pitch and roll. These components are integrated into a small underwater housing easily used by the diver.

The data from these components is used to create the sonar image on the display. From the operator's point of view, the display image may be created by pointing the sonar in the direction at which the operator/diver is looking and starting sonar operation by pressing the user control start button. As the operator scans (rotates) the sonar across an area, the image is accumulated from each bearing and is displayed as a continuous video frame. As an area is re-scanned, new data replaces old data and is stored in its place. Sectors may be generated in either the horizontal or vertical planes.

By way of illustration and not of limitation, the uses of this device include large underwater surveys, location, detection, and classification of underwater objects, and generation of geophysically correct maps over an extended area. With this device, a diver can swim an area and obtain sonar images as he or she proceeds.

In another form of the invention, the manual scan imaging sonar comprises a piezoelectric ceramic transducer, orientation and motion sensors, amplification circuitry, a microcomputer with display capability which is used for operator interface, and a suspension means for allowing a topside operator to dip the sonar into the water and generate images.

In an alternative embodiment, the transducer may be mounted on a retractable pole which is submersible underwater while the rest of the system remains topside with the operator. By using a mechanically rigid pole, all rotations of the transducers may be measured by the motion and orientation sensors in the sonar electronics housing. In this configuration, the topside operator may use the sonar in the same manner as the underwater diver. The extension pole advantageously allows the operator to stay out of the water during the operation.

In either method of use, the images, as well as the position and orientation information pertaining to each image may be stored. With accurate position information and the orientation of the images obtained with the sonar's compass, the images may be properly rotated and translated so that they may be correctly overlaid. This would allow the generation of a mosaic of multiple images to form a much larger area map.

These and other features, and advantages, will be more clearly understood from the following detailed description taken in conjunction with the accompanying drawings. It is important to point out that the illustrations may not necessarily be drawn to scale, and that there may be other embodiments of the present invention which are not specifically illustrated. Furthermore, as the figures may illustrate the same or substantially similar elements, like reference numerals will be used to designate elements that are the same or substantially similar in either shape or function.

BRIEF DESCRIPTION OF THE DRAWINGS

FIG. 1 illustrates a top view of a manual scan sonar, in a first embodiment of the present invention.

FIG. 2 illustrates a front view of the manual scan sonar of FIG. 1.

FIG. 3 illustrates a back view of the manual scan sonar of FIG. 1.

FIG. 5 illustrates a front view of another manual scan sonar, in a second embodiment of the present invention.

FIG. 6 illustrates a back view of the manual scan sonar of FIG. 5.

DESCRIPTION OF ILLUSTRATIVE EMBODIMENTS

The following examples demonstrate exemplary embodiments of the invention. However, those of skill in the art should, in light of the present disclosure, appreciate that many changes may be made in the specific embodiments which are disclosed and still obtain a like or similar result without departing from the spirit and scope of the invention.

Figure 4:
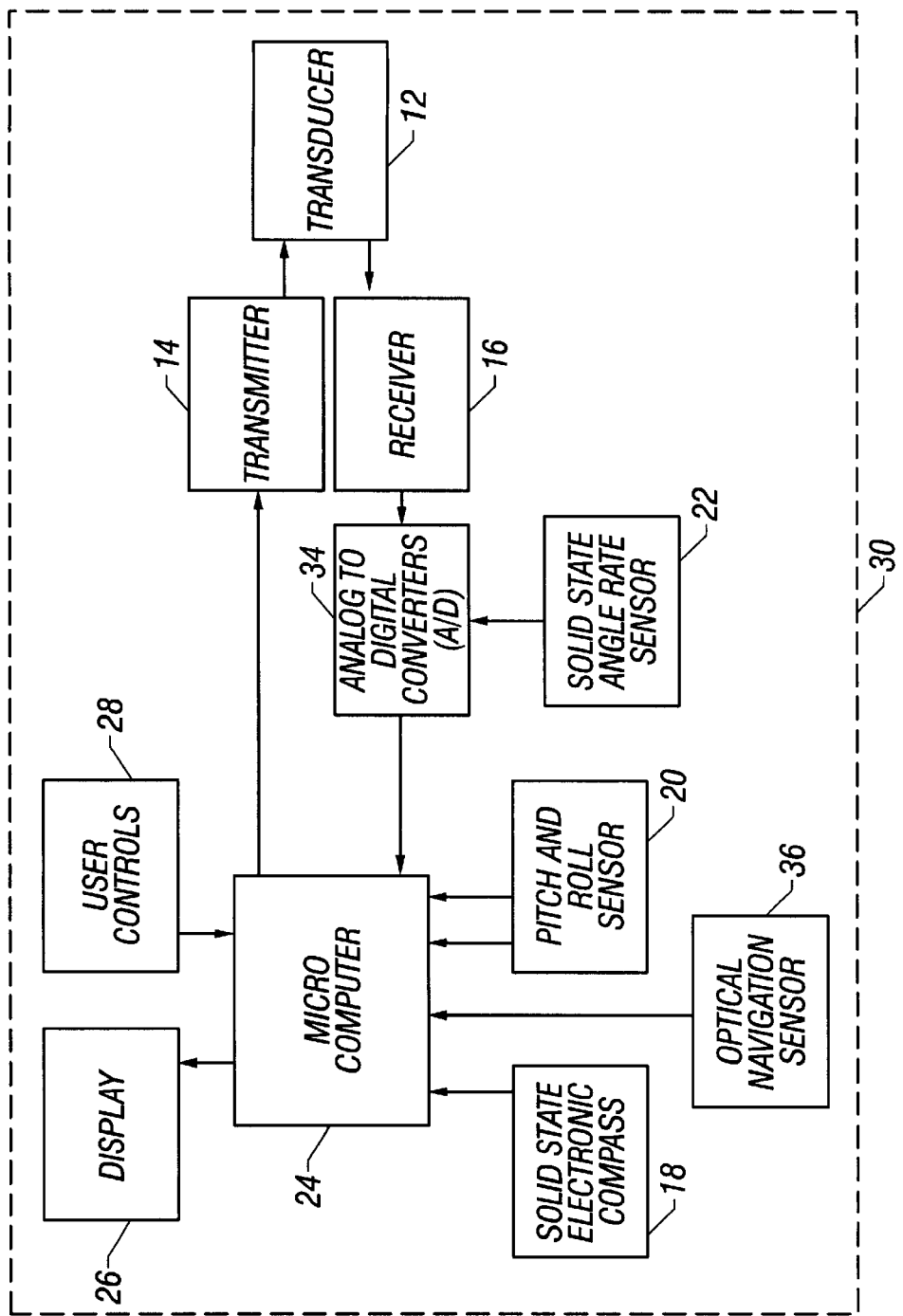
FIG. 4 illustrates a block diagram of the components used in an embodiment of the present invention.

FIGS. 1–3 illustrate a diver-held manual scan single beam sonar device 10, in a first embodiment of the present invention, while FIG. 4 illustrates a block diagram of the components used in an embodiment of the present invention. As shown in FIG. 4 the manual scan single beam sonar device 10 comprises a transducer 12, transmitter 14, receiver 16, electronic compass 18, pitch and roll sensor 20, angle rate sensor 22, and standard microcomputer 24 having a display 26 and user controls 28. All of these components are contained within a compact waterproof housing 30. As used herein, the term "microcomputer" encompasses all of those devices that one skilled in the art knows as microcontroller, microprocessors or microcomputer. All applicable digital signal processing devices used for microcomputer 24 must be programmable to execute a sequence of code, have adequate storage memory for storing data and sequences of code, receive digital signals, output digital signals, and optionally receive analog signals that can be digitized. A microcomputer 24 of this invention may vary from a commercial personal computer of appropriate size to single and multiple chip configurations that accomplish the task of applicable digital signal processing devices stated above.

In a reduction to practice, a prototype manual scan sonar device was built using the following components:

Computer, display and keyboard: Dell Latitude XPi Note-Book computer;

Angle Rate Sensor: Quartz Rate Sensor, by Systron Donner model # QRS11-00100-100;

Compass, Pitch and Roll Sensors: TCM2 Electronic Compass Module, by Precision Navigation;

Analog to Digital Converter: DAQCard-700, by National Instruments;

Transducer—Piezoelectric 1–3 Composite fabricated per drawing 020-4530 from Material Systems Inc. of Littleton Mass.

Receiver—Customized Operational Amplifier circuits for amplification bandpass filtering and impedance matching to the transducer above. Commercial manufacturing volume of receivers does not warrant off the shelf devices, each receiver is customized to a particular transducer but a design is easily accomplished by one skilled in the art having a particular transducer specification.

Transmitter—discrete analog circuits matched to the transducer listed. Commercial manufacturing volume of transmitters does not warrant off the shelf devices, each transmitter is customized to a particular transducer but a design is easily accomplished by one skilled in the art having a particular transducer specification.

It is to be understood, of course, that the elements described herein may be replaced with similar elements without departing from the scope of the present invention.

The transducer 12 may be a single piezoelectric ceramic transducer. In sonar, when electric pulses are applied to a transducer, the transducer converts the electrical energy to acoustic energy and radiates sound pulses into the water in an exemplary pattern shown by 38. The sound pulses travel in the water until they hit an underwater object 32 and are then echoed or reflected back to the transducer, as illustrated in FIG. 1. When the echo from an underwater object impinges on the transducer 12, the transducer 12 converts the acoustic energy of the echo to electrical energy. The range of a given sonar transducer is determined by the sensitivity of the receiver and the power of the transmitter. The power of the transducer for the present invention is typically 220 db re/uPascals at1 yard. The ranges of the transducer for the present invention may be selected by the diver and typically are between about 10 ft. to 160 yards. The present invention breaks up these ranges to 9 ranges although more or less ranges may be selected. These ranges may be changed by simply changing the software of the microcomputer 24. The resolution of the sonar beam is determined by the sampling rate of the analog to digital converter 34 and the frequency that the transducer is operating. The transducer in the present invention is typically operated at 450 Khz carrier frequency a 20 usec pulse width which gives a resolution of approximately 0.5 inches regardless of range.

Every object in a transmission path of the acoustic energy will reflect back to the receiver acoustic energy at a time dependent on its distance from the transmitter/receiver and how reflective it is to the impinging acoustic energy. The sonar beam width determines how much area at a given distance reflects back energy that will arrive at the same time and thus be effectively integrated to form a single amplitude acoustic energy level at the receiver during a given time sampling by the analog to digital converter 34. A typical sonar beam for the present invention is 1 deg. horizontal by 10 deg. vertical when the unit is held in the normal orientation. The diver can rotate the unit so vertical and horizontal interchange. The narrower the sonar beam, the higher the resolution possible by the total system.

The rate that the diver can scan the self contained sonar device to create a video frame is limited only by the resistance of the water, however depending on the range selected a diver may be able to move the self contained sonar device fast enough to cause gaps in the display. The shorter the range the more difficult it is for the diver to move too fast. The longer the range, the longer it takes reflected information to come back from a target and thus the diver may move the unit far enough for a gap to appear before a new pulse is transmitted and received. Although this may be a perceived limitation, it is very evident to the diver or operator when this occurs and they may make necessary adjustments in the scan rate.

The returned acoustic energy received by the transducer 12, which have been converted into electrical energy, are then filtered and amplified by receiver 16. This signal is converted to a digital form by analog to digital converter 34 and processed by the microcomputer 24. Analog to digital converter 34 may be comprised of one converter with a multiplexed input or more than one converter operating in parallel depending on the number of signals to be converted and the conversion rate required. The microcomputer 24 processes the output of the analog to digital converter 34 along with the time from sending to receiving a given acoustic pulse to determine an object's size and reflectivity, as well as an object's range relative to the transmitter. This information is likewise sent to a display controller within the computer that displays the processed information. The resulting images can thus be displayed on the display screen 26.

At this point the display is only a sonar image of one sector of the underwater area observable by a diver carrying the self contained sonar device. Prior art hand held sonar devices carried by a diver, when moved, may display a new sector on command but do not allow the diver to continuously create a video frame of displayed images representing a compilation of a group of sectors of underwater area observable to the diver carrying the self contained sonar device. In effect, prior art hand held sonar devices are not able to integrate the information about multiple sectors because the non-uniform motion of the diver renders the images with no known, quantifiable relation to one another.

The present invention corrects this deficiency of prior art devices by incorporating transmitter/receiver angle, angle rate, pitch, and roll information. In addition to the acoustic information processed, the microcomputer of the present invention also receives and processes absolute bearing and relative angle information from the electronic compass 18 and angle rate information from the angle rate sensor 22. A given received sector of reflected acoustic energy can thus be combined with the bearing, angle and angle rate information to correctly position each new sector of data in relation to previously received sector data on the display. The microcomputer stores previous sectors in memory and thus creates a frame of display, updated and corrected for the non-uniform motion of the diver. Thus manual scanning a single narrow beam sonar 10 of the present invention advantageously incorporates orientation and motion sensors to enable natural human motion to be used in forming large area images.

The present invention includes a solid state compass 18 and a solid state angle rate sensor 22, such as a solid state gyroscope, to yield accurate bearing information. The solid state compass 18 provides direction or bearing information, while a solid state gyroscope 22 provides angle rate information. Specifically, a flux gate compass 18 provides basic heading information, and a fluid based pitch and roll sensor 20 helps the operator keep the sonar level during operation. The pitch and roll sensor 20 sends information to the microcomputer 24, which in turn creates a inset image of a pitch and roll indicator 58 on the display of the sonar frame image 50 to indicate to the diver how to correct the self contained sonar device's orientation to keep it level while manually scanning a frame. The solid state gyroscope 22 provides highly accurate angle rate information which may be integrated to yield very accurate relative angle information. The microcomputer 24 of the present invention may perform further processing of the angle rate information, integrated relative angle information and an average of the compass bearing information to further improve the accuracy of the sonar unit's orientation. This information may be used and combined with the sonar echo data to form and display an additional type of two-dimensional image to the diver.

The display image itself is similar to that obtained from a single beam mechanically scanned sonar system. However, an advantage of the present manual scan sonar is that it eliminates the need for a stable platform and motor. Sonar scanning is achieved by using and tracking the diver's motion through the orientation sensors. In contrast, the mechanically scanned sonar of the prior art requires stepping motors, sector limit controls, and a stable platform to obtain similar images.

An embodiment of the present sonar invention works well as an underwater object locating device. It is particularly suited for generating images within the range of a single scan. However, a navigation sensor 36 may optionally be incorporated to yield position information to expand the sonar's capability in creating images over extended areas beyond the range limit of a single scan. The additional information provided by this navigation sensor 36 allows the diver to swim over a distance much larger than the sonar's range and obtain image data which is correctly placed on a single large area map format display.

FIGS. 5–6 illustrate front and rear views of a topside manual scan single beam sonar 40, in a second embodiment of the present invention. This topside sonar 40 is substantially similar to that of the diver-held sonar 10, illustrated in FIGS. 1–3. This topside sonar 40 incorporates the same or substantially similar components as the diver-held sonar 10, to perform substantially the same function in substantially the same or similar manner. A difference in the topside sonar 40 is that it has a retractable pole 42 that may extend downward from the housing 30. The distance the sonar transducer 12 extends below the water surface may be variable depending on the particular application. The sonar transducer 12 is typically attached near the pole's free end. In this manner, the transducer 12 is submersible underwater, while the rest of the system remains topside with the operator.

Figure 7:
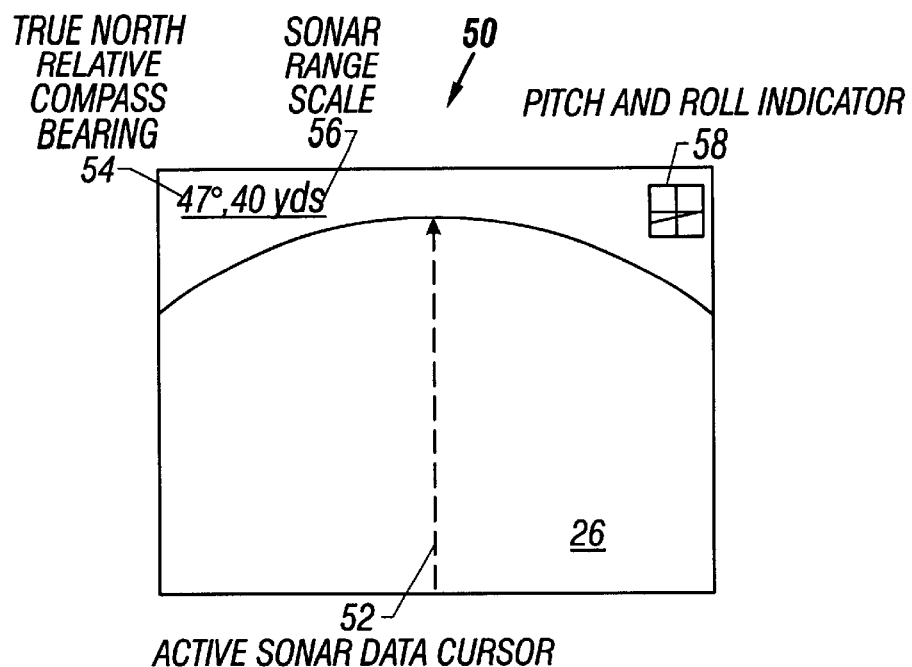
FIG. 7 illustrates the sonar display at the beginning of the image scanning process.

FIG. 7 illustrates the sonar display 50 at the beginning of the image scanning process using an embodiment of the present invention. The sonar imaging operation is started with the sonar transducer 12 pointed towards the object or area to be imaged. The operator, through the user controls 28, begins a new image by initiating a start command. This initiates software running in the computer 24 which clears the display screen 26, positions the active sonar data cursor 52 (where the next sonar echo data will be drawn) in the middle of the screen, prints the current compass bearing 54 and sonar range scale 56 in the upper left of the display screen 26, and displays the pitch and roll indicator 58 in the upper right of the screen. The locations of the compass bearing, sonar range scale, and pitch and roll indicator displays may of course be varied to suit the operator's needs by including or deleting some of the displayed information.

Figure 8:
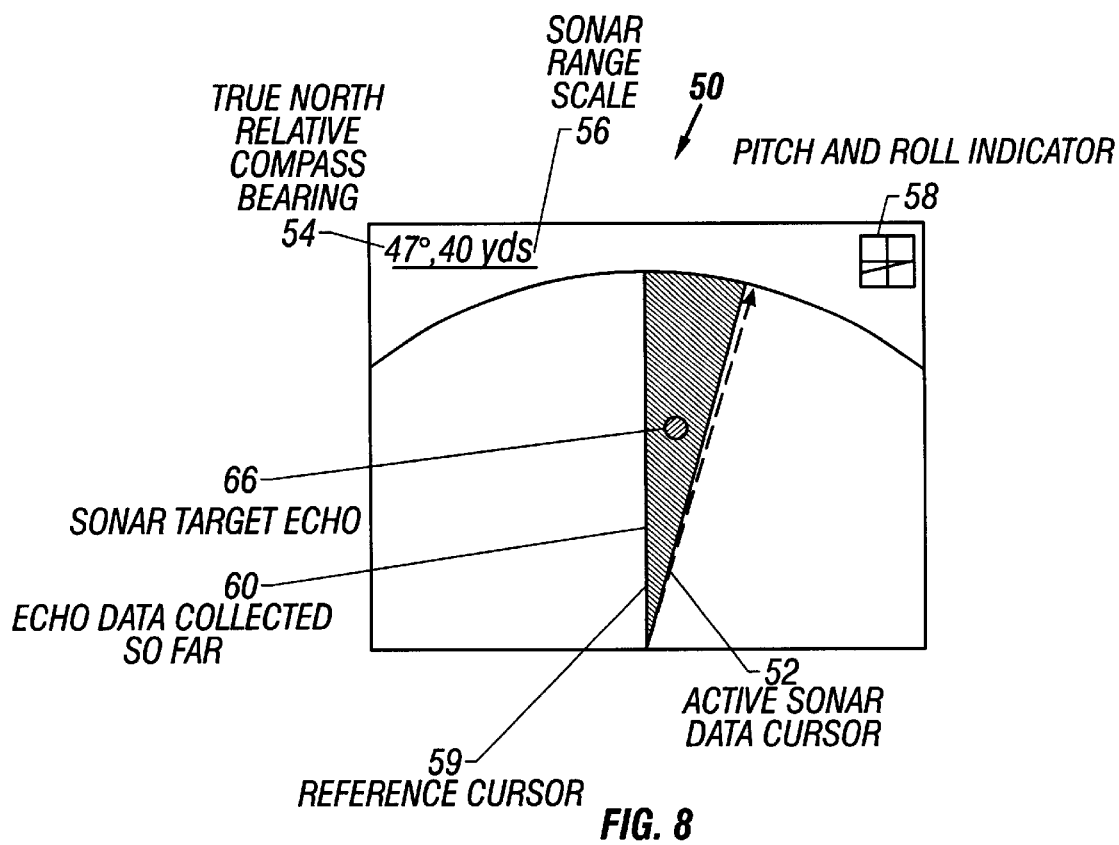
FIG. 8 illustrates the sonar display during the image scanning process when the sonar is rotated to the right.

FIG. 8 illustrates the sonar display 50 during the image scanning process when the sonar is rotated to the right. As the operator rotates or scans the sonar, the angle rate sensor data is used to track the angle of rotation in the sonar. This information is used by the microcomputer 24 to place the sonar echo data 60 and the active sonar data cursor 52 in the correct spatial position on the display. For example, in FIG. 8, the sonar is rotated to the right. The computer thus draws the active sonar data cursor 52 rotated to the right on the display and draws all of the sonar echo data 60 in the appropriate relative position corresponding to the angle of the sonar when the data was received. Since it is only the angle rate sensor data (and not the compass data or pitch and roll data) that is used for sonar image data placement, the sonar images may be generated in any orientation. Therefore, the sonar may be rotated horizontally to generate a top view sonar image, or it may be rolled on its side and rotated vertically to generate a side view sonar image. Compass bearing 54 is used to record the orientation of the system when a sonar image is captured. In an alternative embodiment, the solid state compass 18 data may be combined with the solid state angle rate sensor 22 data to provide improved bearing accuracy. The pitch and roll indicator 58 is provided to give the operator an indication of the sonar's orientation. This allows the operator to keep the sonar level while it is being rotated.

In any of the above embodiments, several physical considerations can affect the operation of the present sonar system. The maximum allowable rate a diver can scan the self contained sonar device and still get an acceptable video frame is limited by a combination of two physical parameters; the range scale and the beam width. As range scale or beam width increases, the maximum allowable scan rate is proportionally reduced. Nevertheless, the maximum scan rate is acceptable for hand held operation in the ranges (10 ft to 160 yards) and beam widths (1 deg×10 deg) that are typically used in this device. Only at very long ranges does the pan rate become substantially prohibitively slow. In this case, acceptable operation may be achieved by the operator's remaining stable for a longer period of time. Another physical limitation to consider is that it is possible to smear the image if the diver/operator translates the unit while scanning to form the image. This distortion is tolerable when the diver is scanning and swimming simultaneously, and may be easily eliminated by having the diver stop during scanning.

The foregoing description and illustrations contained herein demonstrate many of the advantages associated with the present invention. In particular, it has been revealed that a manual scan single beam sonar may be made using solid state technology. The present invention offers significant improvements over the prior art in that it can record and display a high resolution image of both the range and bearing of all targets that the diver has scanned across. This capability represents a tremendous increase in capability over other existing hand held single beam sonar units. An added benefit is that the complexity, and hence the cost, of the system is minimized due to the type of components used to make an embodiment of the present invention. Thus, a display similar to that generated by much larger and more expensive multiple beam sonar systems may be had in a low cost, compact and easily maneuverable hand held unit. Moreover, the invention may be used by either a diver or by a topside operator.

Thus, it is apparent that there has been provided, in accordance with the invention, a manual scan imaging sonar that substantially meets the need and advantages set forth previously. Although the invention has been described and illustrated with reference to specific embodiments thereof, it is not intended that the invention be limited to these illustrative embodiments. Those skilled in the art will recognize that modifications and variations may be made without departing from the spirit of the invention. For example, other computers, sonar electronics, sonar parameters, and motion/orientation sensors than those in the prototype may be used. In addition, in alternative embodiments, no human operation is necessary. An example of this embodiment would include a robotics, autonomous survey device. It is intended that the present invention encompasses all such variations and modifications falling within the scope of the appended claims.

What is claimed is:

1. A method of providing a video frame display of an underwater area to a diver as the diver moves naturally within the underwater area, comprising the steps of:
   scanning the underwater area with a single narrow beam sonar signal emitted from a self contained sonar device;
   determining pitch and roll of the self contained sonar device;
   determining angle and angle rate of the self contained sonar device with a solid state angle sensor located within the self contained sonar device;
   determining compass bearing of the self contained sonar device with a solid state sensor bearing located within the self contained sonar device;
   storing and archiving displayed images with corresponding self contained sonar device, range, bearing, reference bearing and positioning data;
   displaying the pitch and roll, thereby allowing the diver to keep the self contained sonar device level while scanning the single narrow beam sonar;
   producing said video frame display of the underwater area, said video frame display corrected for non-uniform movement of the self contained sonar device by processing and combining the angle, angle rate, and compass bearing information with digitized sonar data using a microcomputer contained within the self contained sonar device.

2. The method according to claim 1, wherein the video frame display of the underwater area is generated by the diver manually scanning the area with the self contained sonar device.

3. The method of claim 2, wherein the video frame display comprises a sonar image of the underwater area about submerged objects, said display being generated by integrating single sector sonar images corrected for non-uniform motion of the diver.

4. The method of claim 3, wherein the video frame display of the underwater area is corrected by processing data from a sonar transmitter and receiver, angle rate sensor, and electronic compass.

5. The method of claim 1, wherein the video frame display has a reference cursor displaying a compass bearing of the self contained sonar device.

6. The method of claim 1, wherein the video frame display has an inset image displaying the pitch and roll of the self contained sonar device relative to a reference.

7. The method of claim 1, wherein the video frame display has an inset image displaying the range of a submerged object relative to the self contained sonar device.

8. The method of claim 1, wherein the video frame display has a reference cursor indicating the direction the self contained sonar device is pointing at the origin of an initiated start cycle.

9. The method of claim 8, wherein the reference cursor's bearing relative to true north is displayed in degrees at said origin.

10. The method of claim 9, wherein the reference cursor displays and holds its initial position until a new start cycle is initiated.

11. The method of claim 10, wherein the video frame display has an active cursor pointing in the direction the self contained sonar device is pointing as it is scanned.

12. The method of claim 1, wherein the microcomputer uses signals from an electronic compass and a solid state angle rate sensor, to calculate angle data of the self contained sonar device and corrects the video frame display for non-uniform movement of the diver scanning the self contained sonar device.

13. The method of claim 1, wherein a global positioning method is used to locate the self contained sonar device and thus allow mappings to be overlapped to display larger areas.

14. A method of providing a video frame display of a sonar image of an underwater area to an operator using a portable self contained sonar device, said method comprising the steps of:
   scanning the underwater area with a single narrow beam sonar signal emitted from within a self contained sonar device;
   determining pitch and roll of the self contained sonar device;
   determining angle and angle rate of the self contained sonar device with a solid state angle sensor located within the self contained sonar device;
   determining compass bearing of the self contained sonar device with a solid state bearing sensor located within the self contained sonar device;

storing and archiving displayed images with corresponding sonar device, range, bearing, reference bearing and positioning data;

displaying the pitch and roll, thereby allowing the operator to keep the self contained sonar device level while scanning the single narrow beam sonar;

producing said video frame display of the underwater area, said video frame display corrected for non-uniform movement of the self contained sonar device by processing and combining the angle, angle rate, and compass bearing information with digitized sonar data using a microcomputer contained within the self contained sonar device.

15. The method according to claim 14, wherein the video frame display of the underwater area is generated by the operator manually scanning the area with the self contained sonar device.

16. The method of claim 15, wherein the video frame display comprises a sonar image of the underwater area about submerged objects, said display being generated by integrating single sector sonar images corrected for non-uniform motion of the operator.

17. The method of claim 16, wherein the video frame display of the underwater area is corrected by processing data from a sonar transmitter and receiver, angle rate sensor, and electronic compass.

18. The method of claim 14, wherein the video frame display has a reference cursor displaying a compass bearing of the self contained sonar device.

19. The method of claim 14, wherein the video frame display has an inset image displaying the pitch and roll of the self contained sonar device relative to a level reference.

20. The method of claim 14, wherein the video frame display has an inset image displaying the range of a submerged object relative to the self contained sonar device.

21. The method of claim 14, wherein the self contained sonar device is attached to a rod and said rod being extendible to a depth below the water surface by an operator and the position of the self contained sonar device is substantially the position of the operator.

22. The method of claim 14, wherein the video frame display has a reference cursor indicating the direction the self contained sonar device is pointing at the origin of an initiated start cycle.

23. The method of claim 22, wherein the reference cursor's bearing relative to true north is displayed in degrees at said origin.

24. The method of claim 22, wherein the reference cursor displays and holds its initial position until a new start cycle is initiated.

25. The method of claim 22, wherein the video frame display has an active cursor pointing in the direction the self contained sonar device is pointing as the self contained sonar device is scanned.

26. The method of claim 14, wherein the microcomputer uses signals from an electronic compass and a solid state angle rate sensor, to calculate angle data of the self contained sonar device and corrects the video frame display for non-uniform movement of the operator scanning the self contained sonar device.

27. The method of claim 14, wherein a global positioning method is used to locate the self contained sonar device and thus allow mappings to be overlapped to display larger areas.

28. A manual scan self contained sonar device, comprising:

a transmitter for developing and outputting an electrical signal having a number of cycles of a given frequency;

a transducer coupled to said transmitter, said transducer for converting said electrical signal to transmitting acoustic waves, said transducer further for receiving and converting reflected acoustic waves into reflected signals;

a receiver coupled to said transducer to condition said reflected signals;

an A/D (analog to digital) converter coupled to said receiver to receive and convert said conditioned reflected signals;

a microcomputer coupled to said A/D converter, said microcomputer for processing information obtained from said A/D converter;

an angle rate sensor coupled to said A/D converter, said angle rate sensor for sensing angle rate movement of said self contained sonar device and to provide said angle rate movement to said A/D converter;

an electronic compass coupled to said microcomputer to provide attitude information of said self contained sonar device to said microcomputer;

a pitch and roll sensor coupled to said microcomputer to provide pitch and roll information of the self contained sonar device to said microcomputer.

29. The manual scan sonar device of claim 28, wherein the self contained sonar device is housed in a powered and water tight container.

30. The manual scan sonar device of claim 29, further comprising a display to provide a video image to the operator.

31. The manual scan sonar device of claim 30, wherein the display has user controls mounted and accessible to the operator.

32. The manual scan sonar device claim 31, wherein the user controls enable the operator to turn on power, start scan cycles and access a menu of microcomputer controlled functions displayable on the display.

33. The manual scan sonar device of claim 32, wherein the display is back lit to allow display visibility and operation of the sonar unit in low light conditions or partially opaque water.

34. The manual scan sonar device of claim 28, wherein the angle rate sensor comprises a sold state gyroscope.

35. The manual scan sonar device of claim 28, wherein the electronic compass comprises a solid state flux gate compass.

36. The manual scan sonar device of claim 30, where the pitch and roll sensor information comprises an inset display on the display screen independent of orientation of the self contained sonar device.

37. The manual scan sonar device of claim 28, wherein the transducer is attached to an extendible, stiff rod having means for routing wires necessary for the transducer's operation.

38. The manual scan sonar device of claim 37, wherein the stiff rod is rigidly attached to the housing containing the angle rate sensor and the electronic compass insuling the transducer and the electronic compass have the same bearing when pointed by an operator.

39. The manual scan sonar device of claim 38, wherein the stiff rod once extended has means to prevent relative motion between the transducer, angle rate sensor and the electronic compass.

* * * * *

UNITED STATES PATENT AND TRADEMARK OFFICE
CERTIFICATE OF CORRECTION

PATENT NO. : 6,226,227 B1
DATED : May 1, 2001
INVENTOR(S) : Keith Lent and Kenneth Krueger It is certified that error appears in the above-identified patent and that said Letters Patent is hereby corrected as shown below:

Column 10, claim 34,
Line 44, please delete "sold" and insert -- solid -- therefor.

Column 10, claim 37,
Line 53, please delete "stiff rod having" and insert -- stiff rod said rod having -- therefor.

Column 10, claim 38,
Line 58, please delete "insuling" and insert -- ensuring -- therefor.

Signed and Sealed this

Eighth Day of January, 2002

Attest:

Attesting Officer

JAMES E. ROGAN
Director of the United States Patent and Trademark Office